(12) United States Patent
Perlman

(10) Patent No.: US 9,779,269 B1
(45) Date of Patent: Oct. 3, 2017

(54) STORAGE SYSTEM COMPRISING PER-TENANT ENCRYPTION KEYS SUPPORTING DEDUPLICATION ACROSS MULTIPLE TENANTS

(71) Applicant: EMC Corporation, Hopkinton, MA (US)

(72) Inventor: Radia Perlman, Redmond, WA (US)

(73) Assignee: EMC IP Holding Company LLC, Hopkinton, MA (US)

(*) Notice: Subject to any disclaimer, the term of this patent is extended or adjusted under 35 U.S.C. 154(b) by 186 days.

(21) Appl. No.: 14/819,920

(22) Filed: Aug. 6, 2015

(51) Int. Cl.
*H04L 9/14* (2006.01)
*G06F 21/78* (2013.01)
*G06F 17/30* (2006.01)

(52) U.S. Cl.
CPC ........ *G06F 21/78* (2013.01); *G06F 17/30342* (2013.01); *G06F 17/30489* (2013.01); *H04L 9/14* (2013.01)

(58) Field of Classification Search
CPC ......... G06F 17/30091; G06F 17/30286; G06F 17/30489; H04L 9/14
See application file for complete search history.

(56) References Cited

U.S. PATENT DOCUMENTS

| | | | |
|---|---|---|---|
| 6,577,734 B1 | 6/2003 | Etzel et al. | |
| 7,814,318 B1 | 10/2010 | Perlman et al. | |
| 8,650,657 B1 | 2/2014 | Shankar et al. | |
| 9,071,429 B1 | 6/2015 | Roth et al. | |
| 9,076,004 B1 * | 7/2015 | Bogorad | G06F 21/602 |
| 9,251,097 B1 * | 2/2016 | Kumar | G06F 12/1408 |
| 2003/0002668 A1 | 1/2003 | Graunke et al. | |
| 2005/0018853 A1 | 1/2005 | Lain et al. | |
| 2006/0282666 A1 | 12/2006 | Kim | |
| 2006/0288232 A1 | 12/2006 | Ho et al. | |
| 2007/0226809 A1 | 9/2007 | Ellard | |
| 2007/0245410 A1 | 10/2007 | Perlman et al. | |

(Continued)

FOREIGN PATENT DOCUMENTS

EP 1414181 A1 4/2004

OTHER PUBLICATIONS

Radia Perlman, "File System Design with Assured Delete," 14th Annual Network and Distributed System Security Symposium (NDSS), Feb.-Mar. 2007, 13 pages.

*Primary Examiner* — Khang Do
(74) *Attorney, Agent, or Firm* — Ryan, Mason & Lewis, LLP

(57) ABSTRACT

An apparatus comprises a storage system and a cryptographic module incorporated in or otherwise associated with the storage system. The cryptographic module is configured to obtain a plurality of data encryption keys used to encrypt respective ones of the data items for storage in the storage system and a plurality of tenant keys for respective ones of the tenants. A given one of the data items is encrypted using a particular one of the data encryption keys. The given data item as stored for a given one of the tenants has associated metadata that includes the particular data encryption key encrypted using the tenant key of the given tenant. Such an arrangement allows for efficient deduplication. For example, a single copy of the given data item can be stored for multiple ones of the tenants by appropriate configuration of the metadata associated with the given data item.

20 Claims, 3 Drawing Sheets

(56) References Cited

U.S. PATENT DOCUMENTS

| | | |
|---|---|---|
| 2009/0110191 A1 | 4/2009 | Sanvido et al. |
| 2011/0158405 A1 | 6/2011 | Choi et al. |
| 2011/0283113 A1 | 11/2011 | Moffat et al. |
| 2012/0072716 A1 | 3/2012 | Hu et al. |
| 2012/0284528 A1 | 11/2012 | Orovitz |
| 2013/0103945 A1* | 4/2013 | Cannon ............... G06F 21/6209 713/168 |
| 2013/0290274 A1* | 10/2013 | Patil ............................ 707/690 |
| 2013/0305057 A1 | 11/2013 | Greco et al. |
| 2013/0322621 A1 | 12/2013 | Yoon et al. |
| 2014/0006802 A1 | 1/2014 | Cachin et al. |
| 2014/0025963 A1 | 1/2014 | Subramanian |
| 2014/0068257 A1 | 3/2014 | Burckard |
| 2014/0068279 A1* | 3/2014 | Kurspahic ............ H04L 9/0894 713/193 |
| 2014/0283010 A1 | 9/2014 | Rutkowski et al. |
| 2014/0351605 A1 | 11/2014 | De Atley et al. |
| 2014/0359309 A1 | 12/2014 | Cachin et al. |
| 2015/0019870 A1 | 1/2015 | Patnala et al. |
| 2015/0220746 A1* | 8/2015 | Li ........................ G06Q 50/24 713/193 |
| 2016/0062918 A1* | 3/2016 | Androulaki ......... G06F 12/1408 713/193 |
| 2016/0154839 A1* | 6/2016 | Bezawada ......... G06F 17/30371 707/692 |
| 2016/0323250 A1* | 11/2016 | Winter ............... H04L 63/0428 |
| 2016/0342814 A1* | 11/2016 | Wang ...................... G06F 21/64 |
| 2017/0005809 A1* | 1/2017 | Adam .................. H04L 9/3268 |

\* cited by examiner

*FIG. 2*

112 — METADATA FOR STORED ENCRYPTED DATA ITEMS

| DATA ITEM ID1 | {DEK1}T1 | {DEK1}T2 | ... | OTHER METADATA FOR ID1 |
| DATA ITEM ID2 | {DEK2}T3 | {DEK2}T4 | ... | OTHER METADATA FOR ID2 |
| DATA ITEM IDn | {DEKn}Tj | {DEKn}Tk | ... | OTHER METADATA FOR IDn |

STORAGE SYSTEM COMPRISING PER-TENANT ENCRYPTION KEYS SUPPORTING DEDUPLICATION ACROSS MULTIPLE TENANTS

FIELD

The field relates generally to storage systems, and more particularly to storage systems that utilize data encryption.

BACKGROUND

In many storage systems, data is stored under encryption utilizing one or more data encryption keys. However, problems can arise when such systems are configured for multiple tenancy. For example, deduplication can be difficult to implement in an efficient manner in some multi-tenant storage systems. Deduplication may generally refer to any of a variety of different processes designed to avoid storing duplicate data items in a storage system. The failure to implement an efficient deduplication process can be wasteful of storage resources, thereby potentially increasing system cost and complexity while also significantly undermining system performance.

SUMMARY

Illustrative embodiments of the invention provide storage systems comprising per-tenant encryption keys advantageously configured to support deduplication across multiple tenants in a particularly efficient manner.

Assume by way of introduction of an illustrative embodiment that a multi-tenant storage system utilizes the same data encryption key to encrypt data items for all of the tenants. In an arrangement of this type, a deduplication process may involve generating a hash value for a given plaintext data item in conjunction with encryption and storage of that data item in the system. The hash value of the plaintext data item is included in a directory along with a pointer to the storage location of the corresponding encrypted data item. The deduplication process then detects situations in which a new plaintext data item to be stored in the system is the same as an existing encrypted data item already stored in the system by comparing a hash value generated from the new plaintext data item to hash values already in the directory. If there is a match, the new data item need not be separately encrypted and stored. Instead, the pointer to the existing data item is referenced for the new data item, and a pointer count indicating the number of data items pointing to the existing data item is incremented.

A deduplication process of this type becomes problematic in the context of a multi-tenant storage system in which different tenants are assigned different tenant keys. Continuing with the foregoing example, assume now that the multi-tenant storage system encrypts data items for storage for each tenant using the corresponding tenant key of that tenant. If the same data item is to be stored by a first tenant under a first tenant key but is also to be stored by a second tenant under a second tenant key, the deduplication process allows both instances of this same data item to be stored in the system. This is because if the data item encrypted under the first tenant key were to be eliminated by the deduplication process, the first tenant could not access the data item encrypted under the second tenant key. Similarly, if the data item encrypted under the second tenant key were to be eliminated by the deduplication process, the second tenant could not access the data item encrypted under the first tenant key.

Some embodiments of the present invention overcome this problem by encrypting a given data item using a data encryption key, and then associating the data item as stored for a given one of multiple tenants with metadata that includes the data encryption key encrypted using a corresponding tenant key. Thus, in the context of the previous example, the same data item to be stored for the first and second tenants is stored only once, encrypted under the data encryption key for that data item, but is associated with metadata that includes both the data encryption key encrypted under the first tenant key, as well as the data encryption key encrypted under the second tenant key.

In one embodiment, an apparatus comprises a storage system and a cryptographic module incorporated in or otherwise associated with the storage system. The cryptographic module is configured to obtain a plurality of data encryption keys used to encrypt respective ones of the data items for storage in the storage system and a plurality of tenant keys for respective ones of the tenants. A given one of the data items is encrypted by the cryptographic module using a particular one of the data encryption keys. The given data item as stored for a given one of the tenants has associated metadata that includes the particular data encryption key encrypted by the cryptographic module using the tenant key of the given tenant.

Such an arrangement allows for efficient deduplication. For example, only a single copy of the given data item can be stored for multiple ones of the tenants by appropriate configuration of the metadata for that data item. The metadata associated with the given data item illustratively includes multiple instances of the particular data encryption key encrypted using respective ones of the tenant keys of the multiple tenants.

As mentioned above, some embodiments advantageously facilitate implementation of deduplication processes across multiple tenants. For example, a deduplication process can efficiently eliminate redundant data items from different tenants through adjustment of the metadata of a single stored data item. This can provide more efficient use of storage resources in multi-tenant storage systems, potentially leading to cost and complexity reductions and associated performance improvements.

These and other embodiments include, without limitation, systems, apparatus, methods and processor-readable storage media.

BRIEF DESCRIPTION OF THE DRAWINGS

FIG. 2 shows an example of metadata associated with stored encrypted data items where the metadata for each such data item comprises multiple instances of a corresponding data encryption key encrypted using respective different per-tenant keys in an illustrative embodiment.

DETAILED DESCRIPTION

Illustrative embodiments of the present invention will be described herein with reference to exemplary storage systems and associated processing devices. It is to be appreciated, however, that embodiments of the invention are not restricted to use with the particular illustrative system and device configurations shown. Accordingly, the term "storage system" as used herein is intended to be broadly construed, so as to encompass, for example, storage systems comprising storage arrays or other types and arrangements of storage products as well as cloud storage systems comprising virtual infrastructure.

Figure 1:
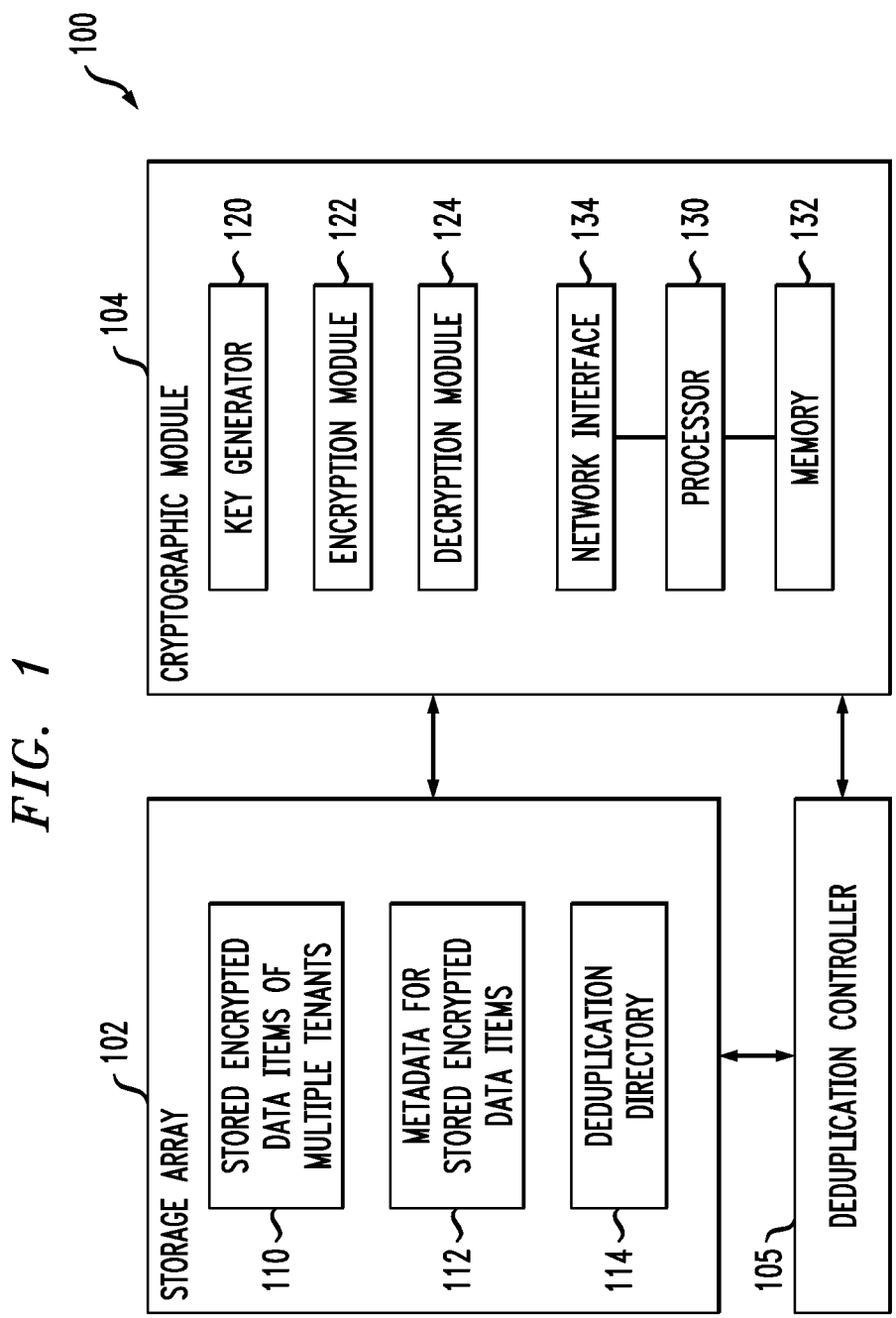
FIG. 1 is a block diagram of a storage system configured with per-tenant encryption keys supporting deduplication across multiple tenants in an illustrative embodiment of the invention.

FIG. 1 shows a storage system 100 configured in accordance with an illustrative embodiment of the present invention. The storage system 100 comprises a storage array 102 coupled to a cryptographic module 104. Also coupled to the storage array 102 and the cryptographic module 104 is a deduplication controller 105 that is configured to run one or more deduplication processes in the system 100 in order to avoid storing duplicate data items in the storage array 102.

Although the cryptographic module 104 is shown as being separate from the storage array 102 in this embodiment, in other embodiments the cryptographic module 104 may be at least partially incorporated into the storage array 102. Such an arrangement of a storage array comprising an internal cryptographic module is considered an example of a "storage system" as that term is broadly utilized herein.

Similarly, the deduplication controller 105 can be at least partially incorporated into at least one of the storage array 102 and the cryptographic module 104 in other embodiments. Numerous other alternative arrangements are possible, including one in which the cryptographic module 104 is part of the deduplication controller 105.

As will be described in more detail below, the cryptographic module 104 is implemented utilizing at least one processing device comprising a processor coupled to a memory. The same or different processing devices may be used to implement at least portions of other system elements such as the storage array 102 or the deduplication controller 105.

The storage array 102 includes stored encrypted data items 110 of multiple tenants, as well as associated metadata 112 for the stored encrypted data items 110. It should be noted that in other embodiments the metadata or various portions thereof may be stored at alternative locations within the system 100, and such locations need not be proximate the stored encrypted data items 110 within the storage array 102.

Also included in the storage array 102 is a deduplication directory 114 that is utilized by the deduplication controller 105 in detecting duplicate data items.

The storage system 100 in some embodiments may comprise a cloud storage system and the multiple tenants may comprise respective tenants of the cloud storage system. In such an arrangement, encrypted data storage is provided to the tenants as a service of the service provider operating the cloud storage system.

The storage array 102 in the storage system 100 can be implemented utilizing storage arrays such as VNX® and Symmetrix VMAX®, both commercially available from EMC Corporation of Hopkinton, Mass.

However, storage systems with per-tenant keys supporting deduplication across multiple tenants as disclosed herein can be implemented using a wide variety of additional or alternative arrangements of storage devices. For example, a given storage system as the term is broadly utilized herein can comprise a plurality of scale-out network-attached storage (NAS) clusters. These NAS clusters may be implemented, for example, using Isilon® storage platforms, such as storage platforms comprising Isilon® platform nodes and associated accelerators in the S-Series, X-Series and NL-Series product lines, commercially available from EMC Corporation. Other storage products such as ViPR® Software-Defined Storage (SDS), ScaleIO™ and XtremIO™, all from EMC Corporation, can additionally or alternatively be used.

The stored encrypted data items 110 and associated metadata 112 are illustratively stored in general storage of the storage array 102. The storage array can additionally or alternatively include other types of storage, such as multiple different types of storage for different portions of the stored data. Other structural components that can be included in the system 100 include a trusted platform module providing highly secure storage for data encryption keys and tenant keys in the system 100. The cryptographic module 104 can be implemented at least in part utilizing such a trusted platform module.

Additionally or alternatively, a key manager implemented in or comprising a trusted platform module can be included in the system 100. The term "cryptographic module" as broadly used herein should be understood to encompass key management functionality such as that relating to encryption or decryption of data items using cryptographic keys as well as generating or otherwise obtaining and updating such keys.

The cryptographic module 104 is configured to perform encryption and decryption operations relating to the stored encrypted data items 110 and the associated metadata 112 of the storage array 102. Such operations in the present embodiment illustratively involve data encryption keys used to encrypt respective ones of the data items for storage in the storage array 102, and tenant keys for respective ones of the multiple tenants. More particularly, a given one of the data items is encrypted by the cryptographic module 104 using a particular one of the data encryption keys. The resulting encrypted data item is stored in the storage array 102 as one of the stored encrypted data items 110 for a given one of the tenants. Furthermore, the given data item as stored for the given one of the tenants has associated metadata in the stored metadata 112 that includes the particular data encryption key encrypted by the cryptographic module 104 using the tenant key of the given tenant.

The tenant keys are also referred to herein as per-tenant keys as each tenant in the given embodiment is assumed to have a different tenant key. The cryptographic module 104 can generate the tenant keys and assign them to the respective tenants. Alternatively, the tenant keys can be obtained by the cryptographic module 104 from the respective tenants. In one possible arrangement of this latter type, a given tenant can log in to the storage system 100 from a remote user terminal and after successful authentication can provide its tenant key to the cryptographic module 104.

Various combinations of these and other techniques for obtaining tenant keys or other types of keys can be used in the storage system 100. For example, the data encryption keys used to encrypt the stored encrypted data items 110 can similarly be generated or otherwise obtained by the cryptographic module 104. The tenant keys can illustratively comprise respective additional data encryption keys, respective key encryption keys, respective wrapping keys or other types of keys suitable for use in encrypting data encryption keys.

The cryptographic module 104 and deduplication controller 105 generally cooperate such that only a single copy of a given data item is stored for multiple ones of the tenants in the stored encrypted data items 110. However, the portion of metadata 112 associated with that data item includes multiple instances of the particular data encryption key encrypted using respective ones of the tenant keys of the multiple tenants.

An example of this configuration of the metadata 112 is illustrated in more detail in FIG. 2. In this example, the metadata 112 includes metadata for a plurality of different data items that are part of the stored encrypted data items 110. More particularly, the metadata 112 as shown includes metadata for data items denoted by data item identifiers ID1, ID2, . . . IDn. It is assumed that these data items are encrypted for storage in the stored encrypted data items 110 using respective data encryption keys denoted DEK1, DEK2, . . . DEKn. The portion of the metadata 112 for a given one of the data items includes multiple instances of the corresponding data encryption key encrypted using respective ones of multiple tenants that have requested storage of that data item.

Thus, for example, the portion of the metadata 112 for data item ID1 includes {DEK1}T1, which denotes DEK1 encrypted under tenant key T1 of Tenant 1, and {DEK1}T2, which denotes DEK1 encrypted under tenant key T2 of Tenant 2. Thus, T1 and T2 are respective tenant keys of the multiple tenants denoted Tenant 1 and Tenant 2 that have both requested storage of the same data item ID1 in the storage system 100. Similarly, the portion of the metadata 112 for data item ID2 includes {DEK2}T3, which denotes DEK2 encrypted under tenant key T3 of Tenant 3, and {DEK2}T4, which denotes DEK2 encrypted under tenant key T4, where T3 and T4 are respective tenant keys of the multiple tenants denoted Tenant 3 and Tenant 4 that have both requested storage of the same data item ID2 in the storage system 100. Although two tenants are associated with each data item in this example, other data items may be associated with more or less than two tenants.

The other portions of the metadata 112 for respective other ones of the data items are configured in a similar manner, utilizing for example one or more tenant keys such as tenant keys illustratively denoted Tj and Tk.

Each portion of the metadata 112 may further include other metadata for the corresponding data item. For example, it is assumed in some embodiments that the other metadata associated with the given data item further comprises a pointer to the single copy of the given data item. Thus, the other metadata for data items ID1, ID2, . . . IDn in the FIG. 2 example comprises respective pointers to the corresponding ones of the stored encrypted data items 110 in the storage array 102. Each such pointer can have a corresponding pointer counter also included in the other metadata associated with that data item, with the pointer counter counting the number of different tenants that have access to that data item. Other pointer arrangements can be used in other embodiments, including arrangements in which pointers and their corresponding pointer counters are maintained in respective entries of the deduplication directory 114. Also, additional or alternative metadata can be used, such as access or modification timestamps as well as various other types of metadata.

It is further assumed in some embodiments that each of the multiple tenants that has requested storage of a given data item can independently access the single copy of the given data item as encrypted for storage by decrypting its corresponding instance of the encrypted data encryption key in the associated metadata 112 using its tenant key and then using the resulting decrypted data encryption key to decrypt the encrypted data item. Thus, for example, with reference again to the metadata 112 of FIG. 2, Tenant 1 and Tenant 2 having respective tenant keys T1 and T2 can both access the single stored encrypted data item ID1 by decrypting the encrypted data encryption key DEK1 using their respective tenant keys T1 and T2, and using the resulting decrypted DEK1 to decrypt the stored encrypted data item ID1. Such actions attributable to a given tenant can be performed in the system 100 by the cryptographic module 104 on behalf of the tenant. For example, the tenant can provide an access request to the system 100 that is processed by the cryptographic module 104.

The accessibility of a given tenant to a given data item can be revoked in the system 100 by deletion of its corresponding instance of the encrypted data encryption key from the associated metadata 112 of that data item. For example, to revoke access of Tenant 4 to the data item ID2 in FIG. 2, the corresponding instance {DEK2}T4 of the encrypted data encryption key for that tenant is simply deleted from the metadata for ID2. The tenant key T4 will then no longer be utilizable to decrypt the data encryption key DEK2. The data encryption key DEK2 may in some embodiments be updated by the cryptographic module 104 in conjunction with an access revocation of this type.

The deletion of the corresponding instance of the encrypted data encryption key from the associated metadata 112 does not affect accessibility of any other ones of the multiple tenants to the given data item, for any such tenant that still has its instance of the encrypted data encryption key in the metadata. Accordingly, with reference to the foregoing example, Tenant 3 having tenant key T3 can still utilize that tenant key to decrypt {DEK2}T3 and then use the resulting DEK2 to decrypt the encrypted data item ID2.

Arrangements of the type described above can be used to efficiently revoke access of a given tenant to all of its associated stored encrypted data items 110 without requiring decryption and re-encryption of any of the stored encrypted data items 110 or modification of their corresponding metadata. More particularly, an advantage of the example key configurations described above is that "shredding" or other deletion of data items for a given tenant can be easily and efficiently achieved through deletion of the corresponding tenant key and therefore without requiring decryption and re-encryption of any stored encrypted data items. Thus, for example, in order to revoke access by Tenant 3 to all encrypted stored data items associated with that tenant, tenant key T3 is simply deleted.

Accordingly, shredding or other deletion of the tenant key of a given tenant by the cryptographic module 104 automatically makes all of the stored encrypted data items inaccessible to that tenant.

Although no modification of the corresponding metadata is required in order to revoke access of a given tenant to all of its data items, the metadata may be updated by deleting from the metadata any instances of encrypted data encryption keys that were encrypted using the tenant key of the given tenant.

Also, tenant keys can be updated without requiring decryption and re-encryption of any of the stored encrypted data items 110. For example, with reference to the instance {DEK1}T1 in the metadata 112 of FIG. 2, if the tenant key T1 is replaced with a new tenant key T1', then only the metadata of the data item ID1 needs to change. More particularly, the data encryption key DEK1 is stored in the metadata in encrypted form using the new tenant key T1' and no changes are made to the corresponding stored encrypted data item ID1.

Again, the metadata arrangements described above are just examples, and numerous other data encryption and tenant key configurations can be used to generate metadata for data items in other embodiments.

The deduplication controller 105 is configured to limit a total number of copies of a given data item that are stored for different ones of the tenants. For example, as noted above, the deduplication controller 105 can be configured to ensure that only a single copy of a given stored encrypted data item is included in the storage array 102, even though multiple tenants have requested storage of that same data item within the system 100.

As a more particular example, the deduplication controller 105 can be configured to determine if a given data item received from a given one of the tenants is a duplicate of an existing encrypted data item previously stored for another one of the tenants. If the received data item is a duplicate of the existing encrypted data item, the deduplication controller 105 can update metadata associated with the existing encrypted data item to include an instance of the particular data encryption key encrypted using the tenant key of the given tenant. Such operations are illustratively performed at least in part in cooperation with the cryptographic module 104. For example, generation of the instance of the particular data encryption key encrypted using the tenant key of the given tenant can be performed by the cryptographic module 104 under the direction of the deduplication controller 105.

Numerous other types of deduplication are possible in the system 100. For example, the deduplication controller 105 can be configured to identify multiple copies of a given data item stored for different ones of the tenants, to delete all but a remaining one of the multiple copies and to update metadata associated with the remaining one of the multiple copies to include instances of the particular data encryption key encrypted using respective ones of the tenant keys of the different tenants. Again, such operations are illustratively performed at least in part in cooperation with the cryptographic module 104.

The cryptographic module 104 in the storage system 100 illustratively comprises a key generator 120, an encryption module 122 and a decryption module 124. The key generator 120 is utilized to generate data encryption keys for use in encrypting data items for storage in the storage array 102. The key generator 120 can also be used to generate tenant keys that are assigned to respective ones of multiple tenants. Additionally or alternatively, at least a subset of the data encryption keys and the tenant keys can be supplied to the cryptographic module from an external component of the storage system 100, although such a component is not explicitly shown in the figure. The encryption and decryption modules 122 and 124 are utilized to encrypt and decrypt data items in conjunction with storage in and retrieval from the storage array 102. These modules are also used to encrypt and decrypt data encryption keys using tenant keys of respective tenants of the system 100.

It is to be appreciated that this particular arrangement of components in the cryptographic module 104 is presented by way of example only, and alternative arrangements can be used in other embodiments. For example, the functionality associated with the modules 120, 122 and 124 in other embodiments can be distributed across a larger number of modules. Also, additional modules can be included, such as a key update controller configured to manage updating of the data encryption keys and the tenant keys. A key update controller of this type can be used to control revocation of tenant access to stored encrypted data items through deletion of tenant keys and updating of associated metadata.

As mentioned previously, the cryptographic module 104 in the FIG. 1 embodiment is assumed to be implemented using at least one processing device. Each such processing device generally comprises at least one processor and an associated memory, and implements one or more functional modules for controlling certain features of the cryptographic module 104.

More particularly, the cryptographic module 104 in this embodiment comprises a processor 130 coupled to a memory 132 and a network interface 134.

The processor 130 illustratively comprises a microprocessor, a microcontroller, an application-specific integrated circuit (ASIC), a field-programmable gate array (FPGA) or other type of processing circuitry, as well as portions or combinations of such circuitry elements.

The memory 132 illustratively comprises random access memory (RAM), read-only memory (ROM) or other types of memory, in any combination. The memory 132 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, an integrated circuit containing electronic memory, or a wide variety of other types of computer program products comprising processor-readable storage media. The term "article of manufacture" as used herein should be understood to exclude transitory, propagating signals.

The network interface 134 allows the cryptographic module 104 to communicate with the storage array 102, deduplication controller 105 and possibly also with other system components not explicitly illustrated. For example, the cryptographic module may be configured in some embodiments to communicate via network interface 134 with user devices and administrator terminals. The network interface 134 illustratively comprises one or more conventional transceivers.

At least portions of the cryptographic module 104, such as portions of one or more of key generator 120, encryption module 122 and decryption module 124, may be implemented at least in part in the form of software that is stored in memory 132 and executed by processor 130.

It is to be understood that the particular set of elements shown in FIG. 1 for configuring a storage system and associated cryptographic module is presented by way of illustrative example only, and in other embodiments additional or alternative elements may be used. Thus, another embodiment may include additional or alternative systems, devices and other entities, as well as different arrangements of modules and other components.

For example, other embodiments can include an input-output controller coupled to the cryptographic module 104 and configured to control storage of data items in the storage system 100. Such a controller can obtain keys from the cryptographic module for use in encrypting data items for storage in the storage system. In an embodiment of this type, the encryption and decryption modules 122 and 124 can be implemented in the input-output controller rather than in the cryptographic module 104 as shown in system 100 of FIG. 1. Alternatively, the input-output controller can include its own encryption and decryption modules, in addition to those of the cryptographic module 104. Other placements of encryption and decryption modules are possible in other embodiments.

It is also possible that the cryptographic module 104 can be implemented at least in part within the input-output controller, or that the input-output controller can be implemented at least in part within the cryptographic module. Such arrangements are considered alternative couplings of the cryptographic module and input-output controller. The input-output controller in other embodiments can be part of the storage array 102.

Communications between the various elements of storage system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the storage array 102, the cryptographic module 104 and the deduplication controller 105 may be implemented using one or more processing platforms. A given such processing platform includes at least one processing device comprising a processor coupled to a memory, and the one or more processing devices may be implemented at least in part utilizing one or more virtual machines or other types of virtualization infrastructure such as Linux containers (LXCs) in association with underlying physical hardware.

It is to be appreciated that a given embodiment of the storage system 100 may include multiple instances of the storage array 102, the cryptographic module 104 and the deduplication controller 105, although only a single instance of each of these elements is shown in the system diagram for clarity and simplicity of illustration.

Accordingly, the particular set of components implemented in the storage system 100 as illustrated in FIG. 1 is presented by way of example only. In other embodiments, alternative sets of components may be used, and such components may exhibit alternative functionality and configurations.

The operation of the storage system 100 will now be described in further detail with reference to the flow diagram of FIG. 3. The process as shown includes steps 300 through 312, and is suitable for use in the storage system 100 but is more generally applicable to other storage systems implementing functionality based on per-tenant keys used to support deduplication across multiple tenants as disclosed herein. Also, the process represents just one example of a type of deduplication that can be implemented in a storage system using per-tenant keys, and a wide variety of alternative types of deduplication can be used. For example, although the FIG. 3 process checks each received data item for duplication before it is stored as an encrypted data item in the storage system, other processes can operate only on stored encrypted data items in detecting and eliminating duplicate data items from the storage system.

In step 300, a plaintext data item is received from one of multiple tenants for storage in the storage system. For example, the plaintext data item may be received in the storage system 100 over a network from a remote terminal or other user device of a given one of the tenants of the system. It is possible that the plaintext data item is actually transmitted by the given tenant in encrypted form but then decrypted in the system 100 to recover the corresponding plaintext data item.

In step 302, a hash value is generated for the received plaintext data item and compared to existing hash values stored in a deduplication directory. The existing hash values are stored for respective existing data items, using respective entries of the deduplication directory. The comparison of hash values in the system 100 of FIG. 1 is made by the deduplication controller 105 using the deduplication directory 114. Alternative techniques can be used in other embodiments to determine if the received plaintext data item is a duplicate of an existing data item, as will be appreciated by those skilled in the art.

In step 304, a determination is made as to whether or not the received data item is a duplicate of an existing data item. In the system 100, this determination is illustratively made by the deduplication controller 105.

If the received data item is determined to be a duplicate, the process moves to step 306, and otherwise proceeds to step 308.

In step 306, the metadata of the existing data item that was determined to be a duplicate of the received data item is updated to include a data encryption key encrypted under the appropriate tenant key. For example, with reference to the metadata 112 as shown in FIG. 2, assume that the received data item in step 300 was data item ID1 received from Tenant 2 having tenant key T2. However, data item ID1 is already existing as a stored encrypted data item in the system, and the received data item is therefore determined to be duplicative of ID1 in step 304 based on the hash value comparison performed in step 302. Accordingly, instead of storing another copy of ID1, the metadata for ID1 is updated to include the instance {DEK1}T2 of the data encryption key DEK1 encrypted using tenant key T2 of Tenant 2.

Also, in this embodiment it is assumed for purposes of illustration that a pointer to the existing data item is maintained in the metadata of the data item ID1. A counter associated with this pointer is also similarly maintained, and is updated in step 306. The pointer counter basically counts the number of tenants that are associated with a given stored data item, with each of those tenants pointing to the same copy of that data item in the stored encrypted data items 110 of the storage array 102. Continuing with the previous example based on the metadata 112 of FIG. 2, if tenant T2 is the second tenant to be associated with the data item ID1, the pointer counter is incremented from its initial value of 1, established when the data item was first received from Tenant 1, to a value of 2.

In other embodiments, at least one of the pointer and the pointer counter could be additionally or alternatively maintained in a directory entry for the corresponding data item in the deduplication directory 114.

After completion of step 306, the process returns to step 300 to process an additional data item received from one of the multiple tenants of the storage system.

Figure 3:
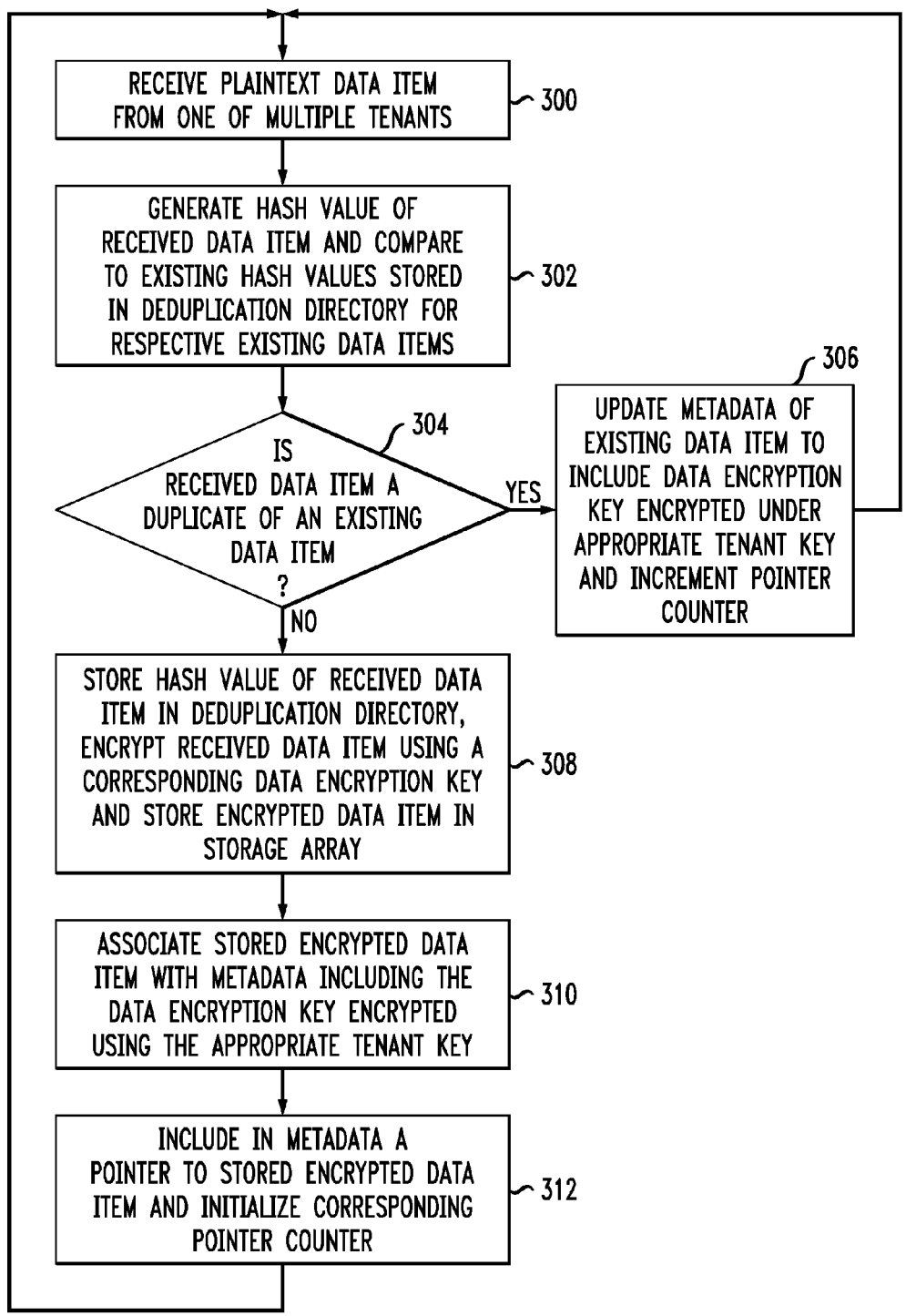
FIG. 3 is a flow diagram of an example of a deduplication process using per-tenant encryption keys in an illustrative embodiment.

The deduplication process of FIG. 3 is therefore configured to detect situations in which a received plaintext data item to be stored in the system is the same as an existing encrypted data item already stored in the system by comparing a hash value generated from the received plaintext data item to hash values already in the deduplication directory. If there is a match, the received data item need not be separately encrypted and stored. Instead, the pointer to the existing data item is referenced for the received data item, and a pointer count indicating the number of data items pointing to the existing data item is incremented.

In step 308, which is reached if the received data item is not a duplicate of any existing data item of the storage system, the hash value of the received data item as generated in step 302 is stored in the deduplication directory, using a directory entry created for that data item. Also, the received data item is encrypted using a corresponding data encryption key. The resulting encrypted data item is stored in a storage array of the storage system. For example, in the context of the system 100 of FIG. 1, the encryption of the received data item is performed by the encryption module 122 of the cryptographic module 104, possibly using a data encryption key generated by the key generator 120, and the encrypted data item is stored as one of the stored encrypted data items 110 in storage array 102.

Although the present embodiment assumes that a unique data encryption key is used for each data item, it is possible in other embodiments to utilize the same data encryption key for multiple data items.

Also, it should be understood in this regard that the term "data item" as used herein is intended to be broadly construed so as to encompass, for example, a block, file, object or other grouping of data suitable for storage in the storage system.

In step 310, the stored encrypted data item is associated with metadata that includes the data encryption key encrypted using the tenant key of the tenant from whom the data item was received in step 300. Returning again to the example based on the metadata 112 of FIG. 2, it is assumed that the data item ID1 is first received in the system 100 from Tenant 1 having tenant key T1. Accordingly, the portion of the metadata 112 for data item ID1 is configured to include the instance {DEK1}T1, which is the data encryption key DEK1 used to encrypt data item ID1, encrypted under the tenant key T1.

In step 312, the metadata associated with the stored encrypted data item is further configured to include a pointer to the stored encrypted data item, and a corresponding pointer counter for that pointer is initialized.

After completion of step 312, the process returns to step 300 to process an additional data item received from one of the multiple tenants of the storage system.

The exemplary FIG. 3 deduplication process ensures that a given data item presented for storage in the storage system by multiple tenants is stored only once, encrypted under the data encryption key for that data item, but is associated with metadata that includes separate instances of the data encryption key encrypted under the respective tenant keys of the multiple tenants. The metadata includes a pointer to the single copy of the stored encrypted data item. Thus, each tenant that presented the data item for storage in the system can access the stored encrypted data item, but duplicate copies of the data items are detected and eliminated, and storage efficiency is improved.

The FIG. 3 process may be viewed as an example of a processing algorithm carried out in the storage system 100 by cooperative interaction of the storage array 102, the cryptographic module 104 and the deduplication controller 105. For example, at least a subset of the particular steps of this processing algorithm may be carried out jointly by the cryptographic module 104 and the deduplication controller 105 in order to update the elements 110, 112 and 114 of the storage array 102.

As mentioned previously, illustrative embodiments such as that described above in conjunction with FIG. 3 permit revocation of access by a given tenant to its stored data items without requiring decryption and re-encryption of any of those data items. Instead, any instances of data encryption keys encrypted under the tenant key of the given tenant are simply deleted from the associated metadata of the corresponding data items. As a result, none of the other tenants that also access one or more of the same stored data items are impacted in any way by the access revocation of the given tenant. However, if a given data item is stored for only a single tenant, as indicated by a pointer count of 1, and that tenant requests deletion of the given data item or has its access to the given data item revoked, the data item and its associated metadata may be deleted in their entirety.

The particular processing operations and other system functionality described in conjunction with the flow diagram of FIG. 3 are presented by way of illustrative example only, and should not be construed as limiting the scope of the invention in any way. Alternative embodiments can use other types of processing operations involving per-tenant keys and associated deduplication across multiple tenants. For example, the ordering of the process steps may be varied in other embodiments, or certain steps may be performed concurrently with one another rather than serially. As additional examples, one or more of the process steps may be repeated periodically for different processing instances, and multiple such processing instances can be performed in parallel with one another within a given storage system.

Also, functionality such as that described in conjunction with the flow diagram of FIG. 3 can be implemented at least in part in the form of one or more software programs stored in memory and executed by a processor of a processing device such as a computer or server. As mentioned previously, a storage device or other memory having executable program code of one or more software programs embodied therein is an example of what is more generally referred to herein as a "processor-readable storage medium."

The foregoing embodiments are therefore illustrative only, and should not be viewed as limiting the scope of any particular embodiment in any way. Those skilled in the art will appreciate that numerous alternative per-tenant key arrangements can be used in other embodiments.

Illustrative embodiments provide a number of significant advantages relative to conventional arrangements. For example, one or more such embodiments advantageously facilitate implementation of deduplication processes across multiple tenants. Example deduplication processes disclosed herein can efficiently eliminate redundant data items from different tenants of a multi-tenant storage system through adjustment of the metadata of a single stored data item. This can provide more efficient use of storage resources in multi-tenant storage systems, potentially leading to cost and complexity reductions and associated performance improvements.

As indicated previously, components of a storage system as disclosed herein can be implemented at least in part in the form of one or more software programs stored in memory and executed by a processor of a processing device. For example, at least portions of the cryptographic module 104 and related functionality for generating and maintaining per-tenant keys and associated metadata for stored encrypted data items are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of storage systems and associated cryptographic modules, as well as related components such as deduplication controllers and deduplication directories. Also, the particular features of the illustrative embodiments of FIGS. 1-3 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a storage system configured to store data items for a plurality of tenants; and
a cryptographic module associated with the storage system;
the cryptographic module being configured to obtain:
a plurality of data encryption keys used to encrypt respective ones of the data items for storage in the storage system; and
a plurality of tenant keys for respective ones of the tenants;
wherein a given one of the data items is encrypted by the cryptographic module using a particular one of the data encryption keys;
wherein the given data item as stored for a given one of the tenants has corresponding metadata that includes the particular data encryption key encrypted by the cryptographic module using the tenant key of the given tenant;
wherein a single copy of the given data item is stored for multiple ones of the tenants and the metadata corresponding to the given data item includes multiple instances of the particular data encryption key encrypted using respective ones of the tenant keys of the multiple tenants;
the metadata corresponding to the given data item thereby being updated, responsive to a determination that a received data item from one of the multiple tenants is a duplicate of the given data item, to include a corresponding one of the multiple instances of the particular data encryption key encrypted using the tenant key of said one of the multiple tenants; and
wherein the cryptographic module is implemented utilizing at least one processing device comprising a processor coupled to a memory.

2. The apparatus of claim 1 wherein the cryptographic module is at least partially incorporated within the storage system.

3. The apparatus of claim 1 wherein the storage system comprises at least one storage array.

4. The apparatus of claim 1 wherein each of the multiple tenants can independently access the single copy of the given data item as encrypted for storage in the storage system by decrypting its corresponding instance of the encrypted data encryption key in the corresponding metadata using its tenant key and using the resulting decrypted data encryption key to decrypt the encrypted data item.

5. The apparatus of claim 1 wherein accessibility of the given tenant to the given data item is revoked by deletion of its corresponding instance of the encrypted data encryption key from the corresponding metadata and wherein deletion of the corresponding instance of the encrypted data encryption key from the corresponding metadata does not affect accessibility of any other ones of the multiple tenants to the given data item.

6. The apparatus of claim 1 wherein the metadata corresponding to the given data item further comprises a pointer to the single copy of the given data item.

7. The apparatus of claim 1 wherein deletion of the tenant key of the given tenant by the cryptographic module automatically makes all of the stored encrypted data items inaccessible to that tenant.

8. The apparatus of claim 1 wherein the storage system comprises a cloud storage system and the tenants comprise respective tenants of the cloud storage system.

9. The apparatus of claim 1 wherein the tenant keys are obtained by the cryptographic module from respective ones of the tenants.

10. The apparatus of claim 1 wherein the tenant keys comprise one of:
respective additional data encryption keys; and
respective key encryption keys.

11. The apparatus of claim 1 further comprising a deduplication controller coupled to the cryptographic module and configured to limit a total number of copies of the given data item that are stored for different ones of the tenants.

12. The apparatus of claim 11 wherein the deduplication controller is configured to determine if the given data item received from the given tenant is a duplicate of an existing encrypted data item previously stored for another one of the tenants, and if the received given data item is a duplicate of the existing encrypted data item, to update metadata corresponding to the existing encrypted data item to include an instance of the particular data encryption key encrypted using the tenant key of the given tenant.

13. The apparatus of claim 11 wherein the deduplication controller is configured to identify multiple copies of the given data item stored for different ones of the tenants, to delete all but a remaining one of the multiple copies and to update metadata corresponding to the remaining one of the multiple copies to include instances of the particular data encryption key encrypted using respective ones of the tenant keys of the different tenants.

14. A method comprising:
configuring a storage system to store data items for a plurality of tenants;
obtaining a plurality of data encryption keys used to encrypt respective ones of the data items for storage in the storage system and a plurality of tenant keys for respective ones of the tenants;
encrypting a given one of the data items using a particular one of the data encryption keys; and
storing the given data item in the storage system for a given one of the tenants with corresponding metadata that includes the particular data encryption key encrypted using the tenant key of the given tenant;
wherein a single copy of the given data item is stored for multiple ones of the tenants and the metadata corresponding to the given data item includes multiple instances of the particular data encryption key encrypted using respective ones of the tenant keys of the multiple tenants;
the metadata corresponding to the given data item thereby being updated, responsive to a determination that a received data item from one of the multiple tenants is a duplicate of the given data item, to include a corresponding one of the multiple instances of the particular data encryption key encrypted using the tenant key of said one of the multiple tenants; and
wherein the configuring, obtaining, encrypting and storing are implemented utilizing at least one processing device comprising a processor coupled to a memory.

15. The method of claim 14 wherein each of the multiple tenants can independently access the single copy of the given data item as encrypted for storage in the storage system by decrypting its corresponding instance of the encrypted data encryption key in the corresponding metadata using its tenant key and using the resulting decrypted data encryption key to decrypt the encrypted data item.

16. The method of claim 14 further comprising revoking accessibility of the given tenant to the given data item by deleting its corresponding instance of the encrypted data encryption key from the corresponding metadata, wherein deletion of the corresponding instance of the encrypted data encryption key from the corresponding metadata does not affect accessibility of any other ones of the multiple tenants to the given data item.

17. A non-transitory processor-readable storage medium having stored therein program code of one or more software programs, wherein the program code when executed by at least one processing device causes said processing device:
to configure a storage system to store data items for a plurality of tenants;
to determine a plurality of data encryption keys used to encrypt respective ones of the data items for storage in the storage system and a plurality of tenant keys for respective ones of the tenants;
to encrypt a given one of the data items using a particular one of the data encryption keys; and
to store the given data item in the storage system for a given one of the tenants with corresponding metadata that includes the particular data encryption key encrypted using the tenant key of the given tenant;
wherein a single copy of the given data item is stored for multiple ones of the tenants and the metadata corresponding to the given data item includes multiple instances of the particular data encryption key encrypted using respective ones of the tenant keys of the multiple tenants;
the metadata corresponding to the given data item thereby being updated, responsive to a determination that a received data item from one of the multiple tenants is a duplicate of the given data item, to include a corresponding one of the multiple instances of the particular data encryption key encrypted using the tenant key of said one of the multiple tenants.

18. The processor-readable storage medium of claim 17 wherein each of the multiple tenants can independently access the single copy of the given data item as encrypted for storage in the storage system by decrypting its corresponding instance of the encrypted data encryption key in the corresponding metadata using its tenant key and using the resulting decrypted data encryption key to decrypt the encrypted data item.

19. The processor-readable storage medium of claim 17 wherein accessibility of the given tenant to the given data item is revoked by deletion of its corresponding instance of the encrypted data encryption key from the corresponding metadata and wherein deletion of the corresponding instance of the encrypted data encryption key from the corresponding metadata does not affect accessibility of any other ones of the multiple tenants to the given data item.

20. The processor-readable storage medium of claim 17 wherein the metadata corresponding to the given data item further comprises a pointer to the single copy of the given data item.

* * * * *